(12) United States Patent
Niu

(10) Patent No.: US 10,669,780 B2
(45) Date of Patent: Jun. 2, 2020

(54) WHIPSTOCKING DRILL FOR ULTRA-SHORT-RADIUS WELL

(71) Applicant: Hebei Zhongrong Petroleum Machinery Co., LTD., Shijiazhuang, Hebei Province (CN)

(72) Inventor: Sujie Niu, Shijiazhuang (CN)

(*) Notice: Subject to any disclaimer, the term of this patent is extended or adjusted under 35 U.S.C. 154(b) by 97 days.

(21) Appl. No.: 16/023,801

(22) Filed: Jun. 29, 2018

(65) Prior Publication Data

US 2019/0017327 A1 Jan. 17, 2019

(30) Foreign Application Priority Data

Jul. 17, 2017 (CN) .......................... 2017 1 0582754

(51) Int. Cl.
| | | |
|---|---|---|
| *E21B 7/04* | (2006.01) | |
| *E21B 7/06* | (2006.01) | |
| *E21B 17/02* | (2006.01) | |
| *E21B 17/04* | (2006.01) | |
| *E21B 17/05* | (2006.01) | |
| *E21B 17/10* | (2006.01) | |

(52) U.S. Cl.
CPC ................ *E21B 7/061* (2013.01); *E21B 7/04* (2013.01); *E21B 17/02* (2013.01); *E21B 17/04* (2013.01); *E21B 17/105* (2013.01)

(58) Field of Classification Search
CPC ... E21B 7/04; E21B 7/06; E21B 7/061; E21B 17/02; E21B 17/04; E21B 17/05
See application file for complete search history.

(56) References Cited

U.S. PATENT DOCUMENTS

| | | | | |
|---|---|---|---|---|
| 2,147,585 A | * | 2/1939 | Trotter .................... | E21B 7/061 175/83 |
| 2009/0000824 A1 | * | 1/2009 | Cao .......................... | E21B 7/06 175/62 |

* cited by examiner

*Primary Examiner* — Cathleen R Hutchins
(74) *Attorney, Agent, or Firm* — W&K IP

(57) ABSTRACT

The invention belongs to the technical field of drills for petroleum, coal mines and exploration, and provides a whipstocking drill for an ultra-short-radius well. The whipstocking drill comprises several flexible drill rods which are sequentially connected end to end, wherein the flexible drill rod at an end portion is connected with a length compensation device, and the flexible drill rods are externally sleeved with several guide sleeves which are movably connected. The invention solves the technical problems of a long whipstocking length and an excessively large turning radius of curvature during whipstocking.

8 Claims, 4 Drawing Sheets

WHIPSTOCKING DRILL FOR ULTRA-SHORT-RADIUS WELL

FIELD OF THE INVENTION

The invention belongs to the technical field of drills for petroleum, coal mines and exploration, and relates to a whipstocking drill for an ultra-short-radius well.

BACKGROUND OF THE INVENTION

In the technical fields of petroleum, coal mines, exploration and the like, horizontal or inclined wells are often drilled. As petroleum exploitation increases, oilfield drilling and workover operations gradually extend to deeper and more complex geology, more and more inclined, horizontal and service wells are drilled, such that side walls of rod bodies are often damaged when drill rods are drilling, and the whipstocking length is long and the turning radius of curvature is too large during whip stocking.

SUMMARY OF THE INVENTION

The invention provides a whipstocking drill for an ultra-short-radius well, which solves the above technical problems.

A technical solution of the invention is achieved as follows:

a whipstocking drill for an ultra-short-radius well comprises:

several flexible drill rods which are sequentially connected end to end, wherein the flexible drill rod at an end portion is connected with a length compensation device, and the flexible drill rods are externally sleeved with several guide sleeves which are movably connected.

As a further technical solution, the flexible drill rod includes a ball seat arranged in the guide sleeve, the ball seat is internally provided with a ball head, one end of the ball head is a spherical body, an external spline is arranged on a side wall of the spherical body, a spherical groove for inserting the spherical body is arranged at one end of the ball seat, an internal spline matching the external spline is arranged on an inner wall of the spherical groove, and a cavity required for the swinging of the ball head is arranged between the external spline and the internal spline.

As a further technical solution, the length compensation device includes a length compensation section including a transmission mandrel, both ends of the transmission mandrel are respectively connected with a piston and a screw drill, an outer side of one end of the transmission mandrel near the piston is sleeved with a transmission sleeve, an outer wall of the transmission mandrel and an inner wall of the transmission sleeve have polygonal mating structures, and one end of the transmission sleeve away from the screw drill is connected with the flexible drill rod via an adapter.

As a further technical solution, a cylinder is disposed, a second clamping slot and a first chuck are respectively arranged at both sides of one end of the cylinder, a second chuck is arranged at one side of the other end of the cylinder, the second chuck is clamped into the second clamping slot of the other cylinder so that the two cylinders can swing to one side, and a first clamping slot for clamping the first chuck of the other cylinder is arranged at the other side of the other end of the cylinder.

As a further technical solution, the second chuck includes a second C-shaped boss connected with the cylinder, the second C-shaped boss is provided with a flat slot, the second clamping slot includes a second C-shaped opening matching the second C-shaped boss, key slots are arranged on outer walls of both sides of the second C-shaped opening, the key slots are arranged at both sides of the flat slot on the adjacent cylinder, the key slot is internally provided with a baffle plate, a middle part of the baffle plate passes through the flat slot, and both ends of the baffle plate are connected with the key slots.

As a further technical solution, the first chuck includes a first C-shaped boss connected with the cylinder, a step is arranged at an end portion of the first C-shaped boss, the first clamping slot includes a first C-shaped opening matching the first C-shaped boss, and a limiting plate clamped into the step of the adjacent cylinder is arranged at a bottom end of the first C-shaped opening.

As a further technical solution, the external spline and the internal spline are arc-shaped.

As a further technical solution, a first joint is arranged at one end of the ball head away from the spherical body, a second joint is arranged at one end of the ball seat away from the spherical groove, and the first joint is in threaded connection with the second joint on the adjacent ball seat.

As a further technical solution, a lock cap is arranged between the ball seat and the ball head, the lock cap is annular, an outer side of the lock cap is connected with the ball seat via a screw, and an inner side of the lock cap clamps the spherical body.

As a further technical solution, the outer wall of the transmission mandrel and the inner wall of the transmission sleeve have hexagonal mating structures.

Compared with the prior art, the invention has the following operating principle and beneficial effects:

1. in the invention, the flexible drill rods are sequentially connected end to end so that the length of a whipstocking section can be shortened and the turning radius of curvature can be reduced, thus more accurately reaching the expected drilling position; the flexible drill rods are externally sleeved with the guide sleeves to protect the flexible drill rods from wear, thus prolonging the service life of the flexible drill rods; several guide sleeves are movably connected so that the guide sleeves can meet the need of flexible swinging, without affecting the ultra-short-radius whipstocking by the flexible drill rods; and the arrangement of the length compensation device can avoid the presence of a length difference during whipstocking, and the overall structure achieves the need for ultra-short-radius whipstocking;

2. in the invention, the spherical body at one end of the ball head is inserted into the spherical groove of the ball seat, the external spline on the side wall of the spherical body is inserted into the internal spline, and the internal spline limits the rotation of the ball head, thus facilitating the transmission of torque when a plurality of flexible drill rods are connected; the cavity is arranged between the external spline and the internal spline so that the external spline of the ball head can swing in the cavity and hence the ball head swings in the ball seat; and the ball head has a swinging angle of ±5° relative to the whole ball seat so that the drill rods have better flexibility, rotate more flexibly as a whole, provide a shorter whipstocking section and a smaller turning radius of curvature during drilling, have high strength and a long service life, and are not easily damaged;

3. in the invention, the outer wall of the transmission mandrel and the inner wall of the transmission sleeve have polygonal mating structures so that the torque between the transmission mandrel and the transmission sleeve can be transmitted more effectively, thus enabling the normal operation of the screw drill at one end of the transmission mandrel; and the piston is arranged at the other end of the transmission mandrel, and the transmission sleeve is sleeved outside the transmission mandrel and the piston, so that the transmission mandrel can move telescopically in the transmission sleeve under the action of the piston, thereby avoiding the presence of a length difference in spite of a certain turning radius of curvature during whipstocking;

4. in the invention, the guide sleeve is arranged at an outer side of the drill rod so as to prevent a side wall of the drill rod from being damaged when the drill rod is drilling, which would otherwise affect the service life of the drill rod; the guide sleeves are formed by a plurality of cylinders connected with each other, and therefore more convenient to use and more suitable for protecting the flexible drill rods; when adjacent cylinders are connected, the second clamping slot is cooperatively connected with the first chuck on the adjacent cylinder so that the two cylinders can swing to one side; and the first chuck and the first clamping slot which cooperate with each other are arranged at the other side of the cylinder, and the first clamping slot clamps the first chuck of the other cylinder so as to avoid the disengagement of the cylinder from the adjacent cylinder upon swinging, thereby ensuring the connection stability, wherein, in this embodiment, adjacent guide sleeves can swing at a certain angle relative to each other so as to achieve the whipstocking need in cooperation with the flexible drill rods, thus shortening the length of a whipstocking section;

5. in the invention, when adjacent cylinders are connected, the second C-shaped boss of the cylinder is clamped into the second C-shaped opening of the adjacent cylinder, the key slots of the cylinder are located at both sides of the flat slot on the adjacent cylinder, the baffle plate passes through the flat slot and the key slots at both sides thereof and is connected with the key slots, and the first chuck is clamped into the first clamping slot on the adjacent cylinder, thus preventing the adjacent cylinders from mutual disengagement or relative rotation; and the adjacent cylinders can swing at a certain angle relative to each other so as to achieve the whipstocking need in cooperation with the flexible drill rods, thus shortening the length of a whipstocking section, wherein experiments have shown that each guide sleeve in this embodiment can swing flexibly at an angle of 3°, so only 30 guide sleeves are needed to meet the desired whipstocking angle of 90°, which greatly shortens the whipstocking radius as compared with the prior art; and 6. in the invention, when adjacent cylinders are connected, the first C-shaped boss is inserted into the first C-shaped opening of the adjacent cylinder, and the limiting plate is clamped into the step on the adjacent cylinder, thus further preventing the adjacent cylinders from mutual disengagement or relative rotation; the cooperation between the limiting plate and the step allows that a swinging angle can be set more easily at the second chuck and the second clamping slot by the adjacent cylinder; the external spline and the internal spline are arc-shaped so that the ball head swings more flexibly in the ball seat; the first joint is arranged at one end of the ball head, the second joint is arranged at one end of the ball seat, the first joint is provided with an external thread, an internal thread is arranged on an inner wall of the second joint, and the first joint is in threaded connection with the second joint on the other ball seat to facilitate the connection between the drill rods; the lock cap is inserted between the ball seat and the ball head, one end of the lock cap is fixedly connected with a side wall of the spherical groove via the screw, and the other end of the lock cap is arranged on the spherical body to clamp the spherical body, prevent the ball head from sliding out and maintain the swingability of the ball head in the ball seat; and the outer wall of the transmission mandrel and the inner wall of the transmission sleeve have hexagonal mating structures which are easily machined and stable with a good torque transmission effect.

BRIEF DESCRIPTION OF THE DRAWINGS

The invention will be further described below in detail with reference to the drawings and particular embodiments.

In the Figures: 1—ball head; 11—spherical body; 12—external spline; 13—first joint; 2—ball seat; 21—spherical groove; 22—internal spline; 23—cavity; 24—second joint; 3—lock cap; 31—screw; 4—cylinder; 5—first clamping slot; 51—first C-shaped opening; 52—limiting plate; 6—second chuck; 61—second C-shaped boss; 62—flat slot; 7—first chuck; 71—first C-shaped boss; 72—step; 8—second clamping slot; 81—second C-shaped opening; 82—key slot; 83—baffle plate; 9—length compensation section; 91—transmission mandrel; 92—piston; 93—screw drill, 94—transmission sleeve; 95—adapter; 96—connecting sleeve.

DETAILED DESCRIPTION OF THE INVENTION

The technical solutions in the embodiments of the invention will be clearly and completely described below in conjunction with the drawings in the embodiments of the invention. It is apparent that the described embodiments are only part of rather than all of the embodiments in the invention. Based on the embodiments of the invention, all other embodiments obtained by the ordinary persons skilled in the art without inventive work belong to the protection scope of the invention.

Figure 1:
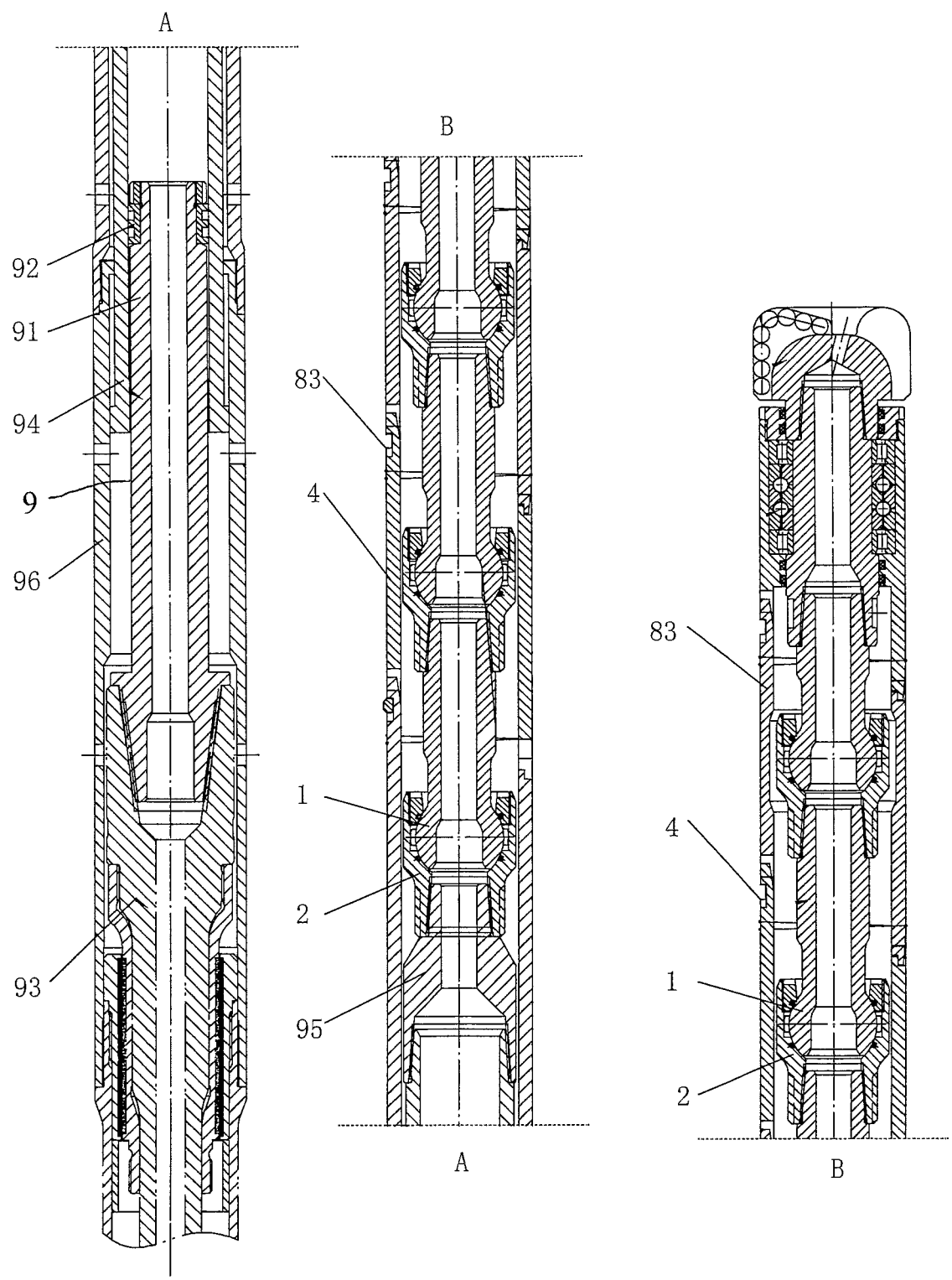
FIG. 1 is a schematic structural view of the invention.
Figure 2:
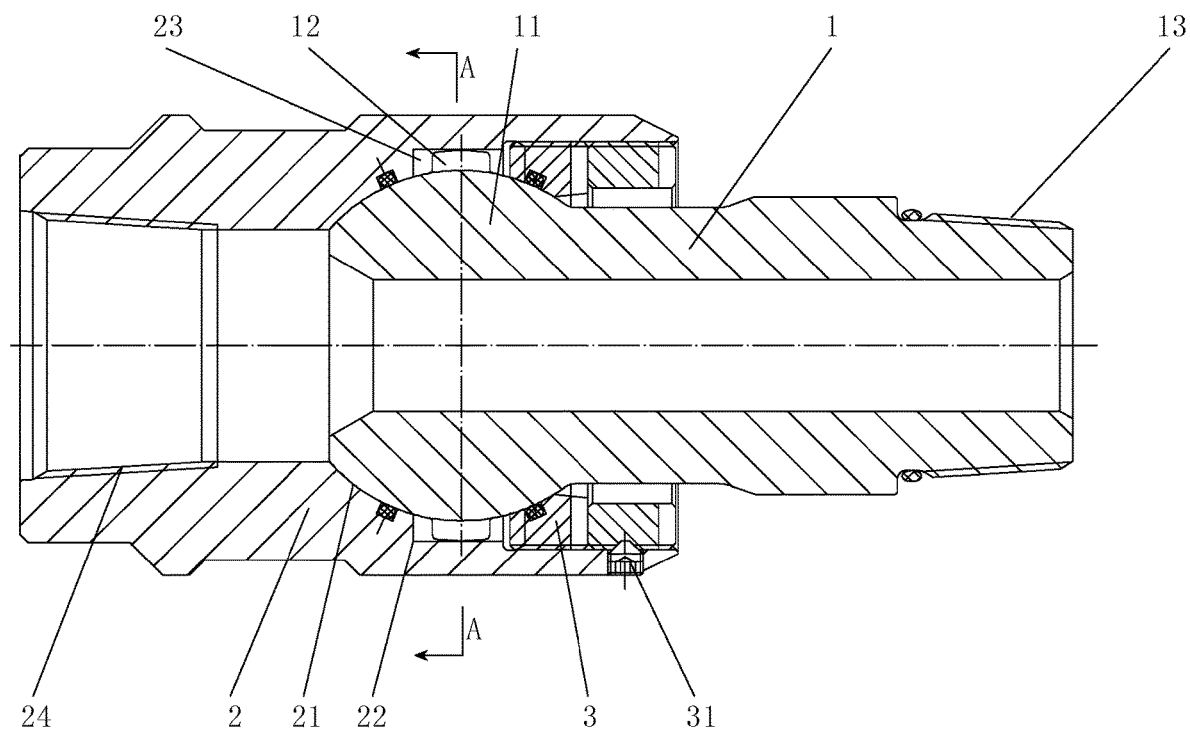
FIG. 2 is a schematic structural view of a flexible drill rod in the invention.
Figure 3:
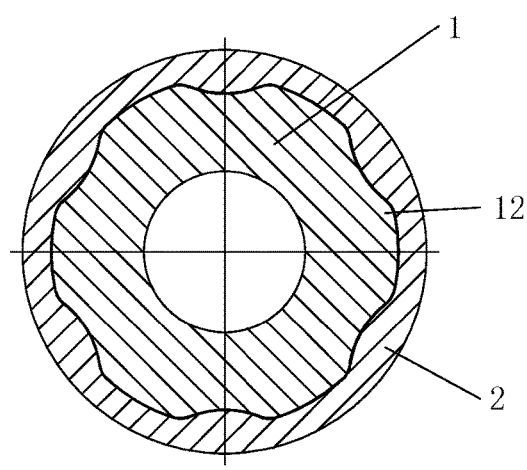
FIG. 3 is a schematic structural view of an A-A section in the invention.
Figure 4:
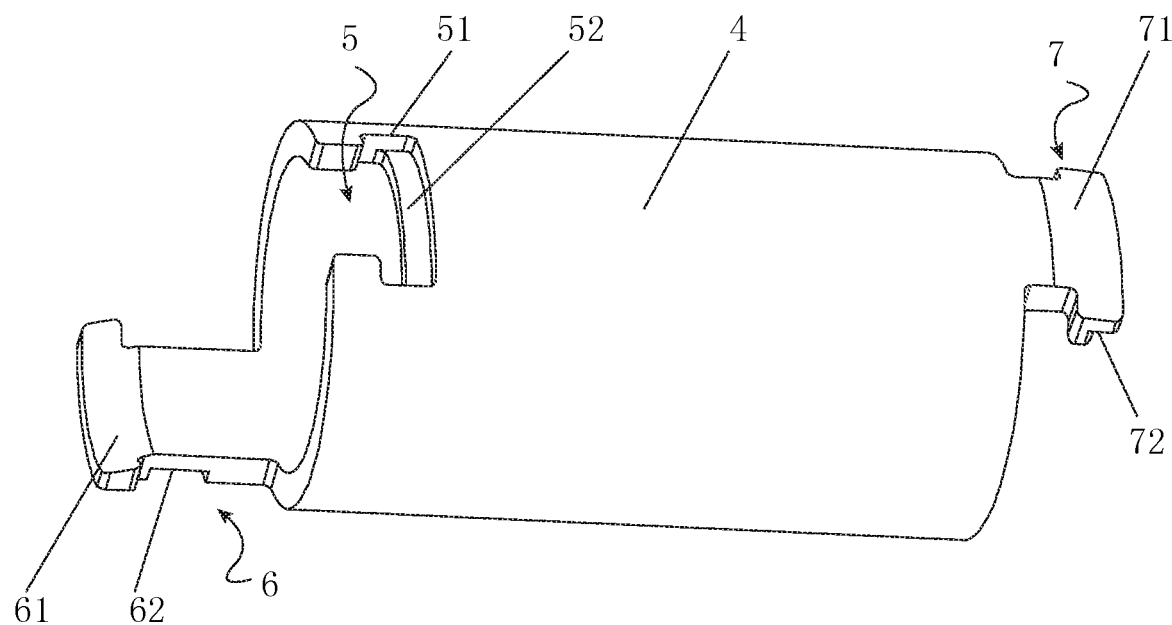
FIG. 4 is a schematic structural view of a guide sleeve in the invention.
Figure 5:
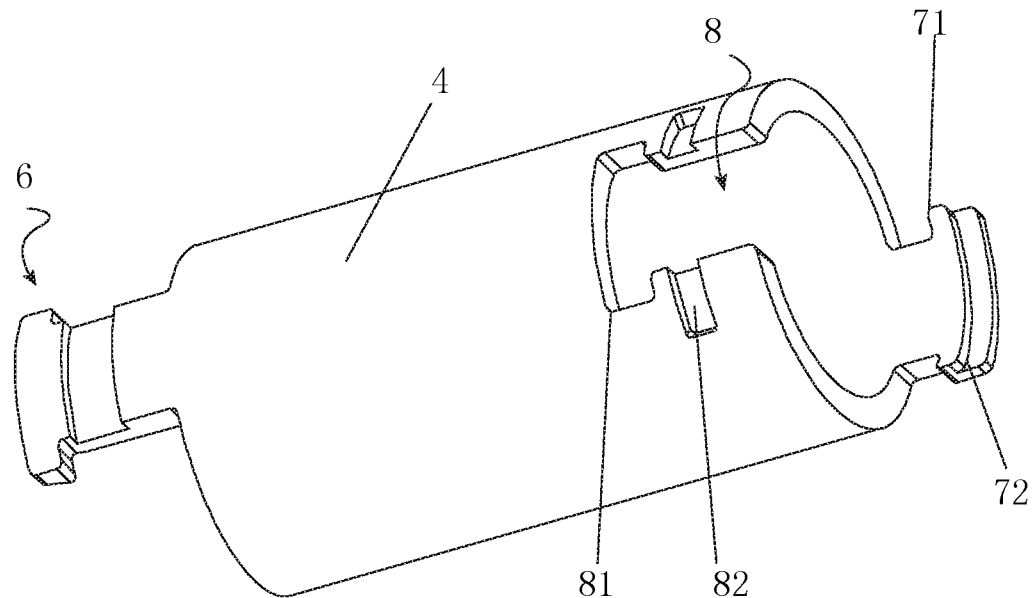
FIG. 5 is a schematic structural view from another angle of the guide sleeve in the invention.
Figure 6:
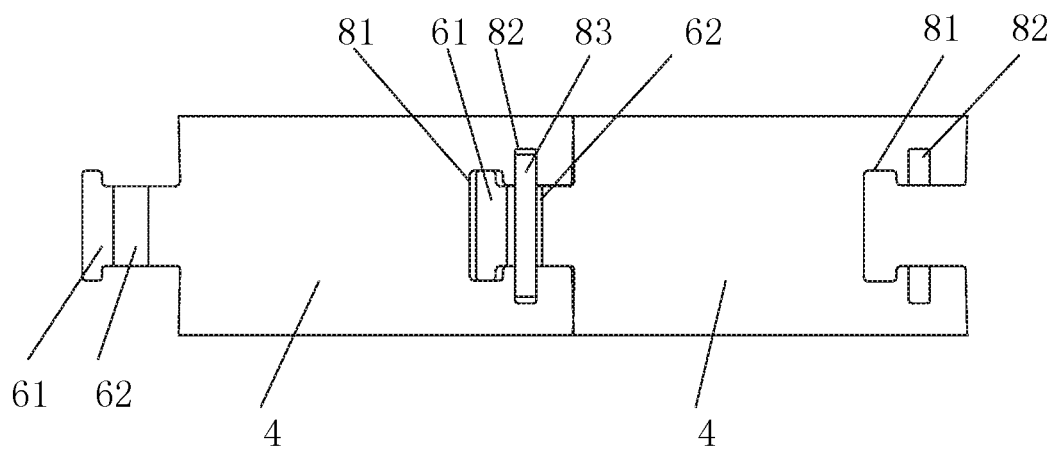
FIG. 6 is a schematic structural view showing the connection of the guide sleeve in the invention.

As shown in FIGS. 1 to 6, the invention provides a whipstocking drill for an ultra-short-radius well, which comprises:

several flexible drill rods which are sequentially connected end to end, wherein the flexible drill rod at an end portion is connected with a length compensation device, and the flexible drill rods are externally sleeved with several guide sleeves which are movably connected.

In this embodiment, the flexible drill rods are sequentially connected end to end so that the length of a whipstocking section can be shortened and the turning radius of curvature can be reduced, thus more accurately reaching the expected drilling position; the flexible drill rods are externally sleeved with the guide sleeves to protect the flexible drill rods from wear, thus prolonging the service life of the flexible drill rods; several guide sleeves are movably connected so that the guide sleeves can meet the need of flexible swinging, without affecting the ultra-short-radius whipstocking by the flexible drill rods; and the arrangement of the length compensation device can avoid the presence of a length difference during whipstocking, and the overall structure achieves the need for ultra-short-radius whipstocking.

Further, the flexible drill rod includes a ball seat 2 which is internally provided with a ball head 1, one end of the ball head 1 is a spherical body 11, an external spline 12 is arranged on a side wall of the spherical body 11, a spherical groove 21 for inserting the spherical body 11 is arranged at one end of the ball seat 2, an internal spline 22 matching the external spline is arranged on an inner wall of the spherical groove 21, and a cavity 23 required for the swinging of the ball head 1 is arranged between the external spline 12 and the internal spline 22.

In this embodiment, the spherical body 11 at one end of the ball head 1 is inserted into the spherical groove 21 of the ball seat 2, the external spline 12 on the side wall of the spherical body 11 is inserted into the internal spline 22, and the internal spline 22 limits the rotation of the ball head 1, thus facilitating the transmission of torque when a plurality of flexible drill rods are connected; the cavity 23 is arranged between the external spline 12 and the internal spline 22 so that the external spline 12 of the ball head 1 can swing in the cavity 23 and hence the ball head 1 swings in the ball seat 2; and the ball head has a swinging angle of ±5° relative to the whole ball seat so that the drill rods have better flexibility, rotate more flexibly as a whole, provide a shorter whipstocking section and a smaller turning radius of curvature during drilling, have high strength and a long service life, and are not easily damaged.

Further, the length compensation device includes a length compensation section 9 including a transmission mandrel 91, both ends of the transmission mandrel 91 are respectively connected with a piston 92 and a screw drill 93, an outer side of one end of the transmission mandrel 91 near the piston 92 is sleeved with a transmission sleeve 94, an outer wall of the transmission mandrel 91 and an inner wall of the transmission sleeve 94 have polygonal mating structures, and one end of the transmission sleeve 94 away from the screw drill 93 is connected with the flexible drill rod via an adapter 95.

In this embodiment, the outer wall of the transmission mandrel 91 and the inner wall of the transmission sleeve 94 have polygonal mating structures so that the torque between the transmission mandrel 91 and the transmission sleeve 94 can be transmitted more effectively, thus enabling the normal operation of the screw drill 93 at one end of the transmission mandrel 91; and the piston 92 is arranged at the other end of the transmission mandrel 91, and the transmission sleeve 94 is sleeved outside the transmission mandrel 91 and the piston 92, so that the transmission mandrel 91 can move telescopically in the transmission sleeve 94 under the action of the piston 92, thereby avoiding the presence of a length difference in spite of a certain turning radius of curvature during whipstocking.

Further, the guide sleeve includes a cylinder 4 arranged outside the flexible drill rod, a second clamping slot 8 and a first chuck 7 are respectively arranged at both sides of one end of the cylinder 4, a second chuck 6 is arranged at one side of the other end of the cylinder 4, the second chuck 6 is clamped into the second clamping slot 8 of the other cylinder 4 so that the two cylinders 4 can swing to one side, and a first clamping slot 5 for clamping the first chuck 7 of the other cylinder 4 is arranged at the other side of the other end of the cylinder 4.

In this embodiment, the guide sleeve is arranged at an outer side of the drill rod so as to prevent a side wall of the drill rod from being damaged when the drill rod is drilling, which would otherwise affect the service life of the drill rod; the guide sleeves are formed by a plurality of cylinders 4 connected with each other, and therefore more convenient to use and more suitable for protecting the flexible drill rods; when adjacent cylinders 4 are connected, the second clamping slot 8 is cooperatively connected with the first chuck 7 on the adjacent cylinder 4 so that the two cylinders 4 can swing to one side; and the first chuck 7 and the first clamping slot 5 which cooperate with each other are arranged at the other side of the cylinder 4, and the first clamping slot 5 clamps the first chuck 7 of the other cylinder 4 so as to avoid the disengagement of the cylinder 4 from the adjacent cylinder 4 upon swinging, thereby ensuring the connection stability. In this embodiment, adjacent guide sleeves can swing at a certain angle relative to each other so as to achieve the whipstocking need in cooperation with the flexible drill rods, thus shortening the length of a whipstocking section.

Further, the second chuck 6 includes a second C-shaped boss 61 connected with the cylinder 4, the second C-shaped boss 61 is provided with a flat slot 62, the second clamping slot 8 includes a second C-shaped opening 81 matching the second C-shaped boss 61, key slots 82 are arranged on outer walls of both sides of the second C-shaped opening 81, the key slots 82 are arranged at both sides of the flat slot 62 on the adjacent cylinder 4, the key slot 82 is internally provided with a baffle plate 83, a middle part of the baffle plate 83 passes through the flat slot 62, and both ends of the baffle plate are connected with the key slots 82.

In this embodiment, when adjacent cylinders 4 are connected, the second C-shaped boss 61 of the cylinder 4 is clamped into the second C-shaped opening 81 of the adjacent cylinder 4, the key slots 82 of the cylinder 4 are located at both sides of the flat slot 62 on the adjacent cylinder 4, the baffle plate 83 passes through the flat slot 62 and the key slots 82 at both sides thereof and is connected with the key slots 82, and the first chuck 7 is clamped into the first clamping slot 5 on the adjacent cylinder 4, thus preventing the adjacent cylinders 4 from mutual disengagement or relative rotation; and the adjacent cylinders 4 can swing at a certain angle relative to each other so as to achieve the whipstocking need in cooperation with the flexible drill rods, thus shortening the length of a whipstocking section. Experiments have shown that each guide sleeve in this embodiment can swing flexibly at an angle of 3°, so only 30 guide sleeves are needed to meet the desired whipstocking angle of 90°, which greatly shortens the whipstocking radius as compared with the prior art.

Further, the first chuck 7 includes a first C-shaped boss 71 connected with the cylinder 4, a step 72 is arranged at an end portion of the first C-shaped boss 71, the first clamping slot 5 includes a first C-shaped opening 51 matching the first C-shaped boss 71, and a limiting plate 52 clamped into the step 72 of the adjacent cylinder 4 is arranged at a bottom end of the first C-shaped opening 51.

In this embodiment, when adjacent cylinders 4 are connected, the first C-shaped boss 71 is inserted into the first C-shaped opening 51 of the adjacent cylinder 4, and the limiting plate 52 is clamped into the step 72 on the adjacent cylinder 4, thus further preventing the adjacent cylinders 4 from mutual disengagement or relative rotation; and the cooperation between the limiting plate 52 and the step 72 allows that a swinging angle can be set more easily at the second chuck 6 and the second clamping slot 8 by the adjacent cylinder 4.

Further, the external spline and the internal spline 22 are arc-shaped.

In this embodiment, the external spline and the internal spline 22 are arc-shaped so that the ball head 1 swings more flexibly in the ball seat 2.

Further, a first joint 13 is arranged at one end of the ball head 1 away from the spherical body 11, a second joint 24 is arranged at one end of the ball seat 2 away from the spherical groove 21, and the first joint 13 is in threaded connection with the second joint 24 on the adjacent ball seat 2.

In this embodiment, the first joint 13 is arranged at one end of the ball head 1, the second joint 24 connected with the first joint 13 is arranged at one end of the ball seat 2, the first joint 13 is provided with an external thread, an internal thread is arranged on an inner wall of the second joint 24, and the first joint 13 is in threaded connection with the second joint 24 on the adjacent ball seat 2 to facilitate the connection between the drill rods.

Further, a lock cap 3 is arranged between the ball seat 2 and the ball head 1, the lock cap 3 is annular, an outer side of the lock cap 3 is connected with the ball seat 2 via a screw 31, and an inner side of the lock cap clamps the spherical body 11.

In this embodiment, the lock cap 3 is inserted between the ball seat 2 and the ball head 1, one side of the lock cap is fixedly connected with a side wall of the spherical groove 21 via the screw 31, and the other side of the lock cap is arranged on the spherical body 11 to clamp the spherical body 11, prevent the ball head 1 from sliding out and maintain the swingability of the ball head 1 in the ball seat 2.

Further, the outer wall of the transmission mandrel 91 and the inner wall of the transmission sleeve 94 have hexagonal mating structures.

In this embodiment, the outer wall of the transmission mandrel 91 and the inner wall of the transmission sleeve 94 have hexagonal mating structures which are easily machined and stable with a good torque transmission effect.

The above description only refers to preferred embodiments of the invention and is not intended to limit the invention. Any modification, equivalent replacement, improvement and the like made within the spirit and principle of the invention shall be included within the protection scope of the invention.

The invention claimed is:

1. A whipstocking drill for an ultra-short-radius well, comprising several flexible drill rods which are sequentially connected end to end, the flexible drill rod at an end portion being connected with a length compensation device, and the flexible drill rods being externally sleeved with several guide sleeves which are movably connected wherein the length compensation device includes a length compensation section including a transmission mandrel, both ends of the transmission mandrel are respectively connected with a piston and a screw drill, an outer side of one end of the transmission mandrel near the piston is sleeved with a transmission sleeve, an outer wall of the transmission mandrel and an inner wall of the transmission sleeve have polygonal mating structures, and one end of the transmission sleeve away from the screw drill is connected with the flexible drill rod via an adapter.

2. The whipstocking drill for an ultra-short-radius well according to claim 1, wherein the flexible drill rod includes a ball seat arranged in the guide sleeve, the ball seat is internally provided with a ball head, one end of the ball head is a spherical body, an external spline is arranged on a side wall of the spherical body, a spherical groove for inserting the spherical body is arranged at one end of the ball seat, an internal spline matching the external spline is arranged on an inner wall of the spherical groove, and a cavity required for the swinging of the ball head is arranged between the external spline and the internal spline.

3. The whipstocking drill for an ultra-short-radius well according to claim 2, wherein the external spline and the internal spline are arc-shaped.

4. The whipstocking drill for an ultra-short-radius well according to claim 2, wherein a first joint is arranged at one end of the ball head away from the spherical body, a second joint is arranged at one end of the ball seat away from the spherical groove, and the first joint is in threaded connection with the second joint on the adjacent ball seat.

5. The whipstocking drill for an ultra-short-radius well according to claim 2, wherein a lock cap is arranged between the ball seat and the ball head, the lock cap is annular, an outer side of the lock cap is connected with the ball seat via a screw, and an inner side of the lock cap clamps the spherical body.

6. The whipstocking drill for an ultra-short-radius well according to claim 1, the guide sleeve includes a cylinder arranged outside the flexible drill rod, a second clamping slot and a first chuck are respectively arranged at both sides of one end of the cylinder, a second chuck is arranged at one side of the other end of the cylinder, the second chuck is clamped into the second clamping slot of the other cylinder so that the two cylinders can swing to one side, and a first clamping slot for clamping the first chuck of the other cylinder is arranged at the other side of the other end of the cylinder.

7. A whipstocking drill for an ultra-short-radius well, comprising several flexible drill rods which are sequentially connected end to end, the flexible drill rod at an end portion being connected with a length compensation device, and the flexible drill rods being externally sleeved with several guide sleeves which are movably connected;
wherein the guide sleeve includes a cylinder arranged outside the flexible drill rod, a second clamping slot and a first chuck are respectively arranged at both sides of one end of the cylinder, a second chuck is arranged at one side of the other end of the cylinder, the second chuck is clamped into the second clamping slot of the other cylinder so that the two cylinders can swing to one side, and a first clamping slot for clamping the first chuck of the other cylinder is arranged at the other side of the other end of the cylinder;
wherein the second chuck includes a second C-shaped boss connected with the cylinder, the second C-shaped boss is provided with a flat slot, the second clamping slot includes a second C-shaped opening matching the second C-shaped boss, key slots are arranged on outer walls of both sides of the second C-shaped opening, the key slots are arranged at both sides of the flat slot on the adjacent cylinder, the key slot is internally provided with a baffle plate, a middle part of the baffle plate passes through the flat slot, and both ends of the baffle plate are connected with the key slots.

8. A whipstocking drill for an ultra-short-radius well, comprising several flexible drill rods which are sequentially connected end to end, the flexible drill rod at an end portion being connected with a length compensation device, and the flexible drill rods being externally sleeved with several guide sleeves which are movably connected;
wherein the guide sleeve includes a cylinder arranged outside the flexible drill rod, a second clamping slot and a first chuck are respectively arranged at both sides of one end of the cylinder, a second chuck is arranged at one side of the other end of the cylinder, the second chuck is clamped into the second clamping slot of the other cylinder so that the two cylinders can swing to one side, and a first clamping slot for clamping the first chuck of the other cylinder is arranged at the other side of the other end of the cylinder;

wherein the first chuck includes a first C-shaped boss connected with the cylinder, a step is arranged at an end portion of the first C-shaped boss, the first clamping slot includes a first C-shaped opening matching the first C-shaped boss, and a limiting plate clamped into the step of the adjacent cylinder is arranged at a bottom end of the first C-shaped opening.

* * * * *